United States Patent
Howard et al.

(10) Patent No.: US 7,533,073 B2
(45) Date of Patent: May 12, 2009

(54) METHODS AND APPARATUS FOR HEURISTIC SEARCH TO OPTIMIZE METRICS IN GENERATING A PLAN HAVING A SERIES OF ACTIONS

(75) Inventors: Michael D. Howard, Westlake Village, CA (US); Eric Huang, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/566,984

(22) Filed: Dec. 5, 2006

(65) Prior Publication Data

US 2007/0129834 A1 Jun. 7, 2007

Related U.S. Application Data

(60) Provisional application No. 60/742,321, filed on Dec. 5, 2005.

(51) Int. Cl.
*G06N 5/00* (2006.01)
(52) U.S. Cl. .......................... 706/47; 706/45
(58) Field of Classification Search .................. 706/47, 706/45
See application file for complete search history.

(56) References Cited

U.S. PATENT DOCUMENTS

| | | | |
|---|---|---|---|
| 5,323,470 A | 6/1994 | Kara et al. | |
| 5,940,816 A | 8/1999 | Fuhrer et al. | |
| 5,953,707 A * | 9/1999 | Huang et al. | 705/10 |
| 6,151,582 A | 11/2000 | Huang et al. | |
| 6,687,606 B1 | 2/2004 | Moitra et al. | |
| 6,751,661 B1 | 6/2004 | Geddes | |
| 2003/0163334 A1 | 8/2003 | Pachon et al. | |
| 2003/0229529 A1* | 12/2003 | Mui et al. | 705/8 |
| 2004/0128645 A1 | 7/2004 | Srivastava | |

FOREIGN PATENT DOCUMENTS

| | | |
|---|---|---|
| JP | 05297947 | 11/1993 |
| WO | WO 03/096054 | 11/2003 |
| WO | WO 2004/003680 | 1/2004 |
| WO | WO 2005/059900 | 7/2004 |

OTHER PUBLICATIONS

Lotem et al. "Using Planning Graphs for Solvin HTN Planning Problems". 1998, American Association for Artificial Intelligence. pp. 1-7.*
van der Krogt et al. "A Resource Based Framework for Planning and Replanning". 2003, Delft University of Technology.*

(Continued)

*Primary Examiner*—Wilbert L Starks, Jr.
(74) *Attorney, Agent, or Firm*—Daly, Crowley, Mofford & Durkee, LLP

(57) ABSTRACT

Methods and apparatus to provide techniques for planners that records constraints over a set of numeric state variables for each fact and characterizes the set of states in which that fact is true to provide more information to reason about mutual exclusions among sets of states offering a tighter bound on the metric cost of a plan than existing planners currently attain. This more accurate estimate can avoid irrelevant states and decrease search times.

17 Claims, 9 Drawing Sheets

OTHER PUBLICATIONS

Do et al. "Sapa: A Multi-objective Metric Temporal Planner". Dec. 2003. Journal of Artificial Intelligence Research 20 (2003) pp. 155-194.*

Notification of transmittal of the International Search Report dated Nov. 7, 2005, PCT/US2005/025332.

The International Seach Report dated Jul. 15, 2005, PCT/US2005/025332.

Written Opinion of the International Searching Authority dated Jul. 15, 2005, PCT/US2005/025332.

Larry Ground, Alexander Kott, Ray Budd, A Knowledge-Based Tool for Planning of Military Operations: the Coalition Perspective, pp. 195-203, BBN Technologies, Pittsburgh, PA.

Roman Van Der Krogt, Mathijs De Weerdt, Cees Witteveen, Exploiting Opportunities Using Planning Graphs, pp. 1-12, Delft University of Technology.

Alfonso Gerevini, Allesandro Saetti, Ivan Serina, Planning Through Stochastic Local Search and Temporal Action Graphs in LPG, Dec. 2003, pp. 239-290.

Mihai Boicu, Gheorghe Tecuci, Dorin Marcu, Michael Bowman, Ping Shyr, Florin Ciucu, Cristian Levcovici, Disciple-COA: From Agent Programming to Agent Teaching, Jan. 2000, pp. 1-8, Learning Agents Laboratory, Department of Computer Science, George Mason University, Fairfax, VA 22030.

* cited by examiner

```
(define (problem settlers)
(:domain civ)
(:objects
    A  B - place
    Ship Cart - vehicle)
(:init
    (= (labour)  0)
    (= (pollution)  0)
    (connected-by-land  A  B)
    (connected-by-sea  A  B)
    (is-cart  Cart)
    (is-ship  Ship)
    (at  Cart  A)
    (at  Ship  A) )
(:goal (and
    (at  Cart  B)
    (at  Ship  B) ) )
(:metric minimize
    (+ (pollution)  (labour) ) ) )
```

*FIG. 1*

```
(:action transport-cart-on-ship
    :parameters
        (?v1 - vehicle  ?v2 - vehicle
        ?src - place  ?dest - place)
    :precondition
        (and (is-ship ?v1) (at ?v1 ?loc)
             (is-cart ?v2) (at ?v2 ?loc)
             (connected-by-sea ?src ?dest) )
    :effect
        (and (not (at ?v1 ?src) )
             (not (at ?v2 ?src) )
             (at ?v1 ?dest)
             (at ?v2 ?dest)
             (increase (pollution) 2)
             (increase (labour) 1) )
```

*FIG. 3*

| Action | Relaxed state | Fact-fact-mutexes | Numeric-numeric consistency | Fact-numeric consistency |
|---|---|---|---|---|
| Initial state | at-cart-A<br>wood-A = [2, 2]<br>wood-B = [0, 0]<br>wood-cart = [0, 0] |  | wood-A = 2, wood-B = 0<br>wood-A = 2, wood-cart = 0<br>wood-B = 0, wood-cart = 0 | at-cart-A, wood-A = 2<br>at-cart-A, wood-B = 0<br>at-cart-A, wood-cart = 0 |
| load-cart-at-A | at-cart-A<br>wood-A = [1, 2]<br>wood-B = [0, 0]<br>wood-cart = [0, 1] | at-cart-A, at-cart-B | wood-A = 2, wood-B = 0<br>wood-A = 1, wood-B = 0<br>wood-A = 2, wood-cart = 0<br>wood-A = 1, wood-cart = 1<br>wood-B = 0, wood-cart = 0<br>wood-B = 0, wood-cart = 1 | at-cart-A, wood-A = 2<br>at-cart-A, wood-A = 1<br>at-cart-A, wood-B = 0<br>at-cart-A, wood-cart = 0<br>at-cart-A, wood-cart = 1 |
| move-cart-A-B | at-cart-A<br>at-cart-B<br>wood-A = [1, 2]<br>wood-B = [0, 0]<br>wood-cart = [0, 1] | at-cart-A, at-cart-B | wood-A = 2, wood-B = 0<br>wood-A = 1, wood-B = 0<br>wood-A = 2, wood-cart = 0<br>wood-A = 1, wood-cart = 1<br>wood-B = 0, wood-cart = 0<br>wood-B = 0, wood-cart = 1 | at-cart-A, wood-A = 2<br>at-cart-A, wood-A = 1<br>at-cart-A, wood-B = 0<br>at-cart-A, wood-cart = 0<br>at-cart-A, wood-cart = 1<br>at-cart-B, wood-A = 2<br>at-cart-B, wood-A = 1<br>at-cart-B, wood-B = 0<br>at-cart-B, wood-cart = 0<br>at-cart-B, wood-cart = 1 |
| unload-cart-at-B | at-cart-A<br>at-cart-B<br>wood-A = [1, 2]<br>wood-B = [0, 1]<br>wood-cart = [0, 1] | at-cart-A, at-cart-B | wood-A = 2, wood-B = 0<br>wood-A = 2, wood-B = 1<br>wood-A = 1, wood-B = 0<br>wood-A = 1, wood-B = 1<br>wood-A = 2, wood-cart = 0<br>wood-A = 1, wood-cart = 1<br>wood-A = 1, wood-cart = 0<br>wood-B = 0, wood-cart = 0<br>wood-B = 0, wood-cart = 1<br>wood-B = 1, wood-cart = 0 | at-cart-A, wood-A = 2<br>at-cart-A, wood-A = 1<br>at-cart-A, wood-B = 0<br>at-cart-A, wood-cart = 0<br>at-cart-A, wood-cart = 1<br>at-cart-B, wood-A = 2<br>at-cart-B, wood-A = 1<br>at-cart-B, wood-B = 0<br>at-cart-B, wood-B = 1<br>at-cart-B, wood-cart = 1<br>at-cart-B, wood-cart = 0 |

*FIG. 8*

METHODS AND APPARATUS FOR HEURISTIC SEARCH TO OPTIMIZE METRICS IN GENERATING A PLAN HAVING A SERIES OF ACTIONS

CROSS-REFERENCE TO RELATED APPLICATIONS

The present application claims the benefits of U.S. Provisional Patent Application No. 60/742,321, filed on Dec. 5, 2005, which is incorporated herein by reference.

BACKGROUND

As is known in the art, deliberative decision-making often relies on a plan: a sequence of parameterized actions that lead from an initial state to a desired goal state. The plan breaks high-level goals into smaller goals that are more easily attained, and that together achieve the overall goal. Planning is a search in a state space that is exponential in the number of features, which is intractable in general; thus, it is critically important for scalability to be able to focus the search intelligently.

Various planner systems are known in the art. For example, the Graphplan planning graph heuristic improved the efficiency of planning in propositional state spaces by ignoring the delete effects of each so-called STRIPS-style action. This relaxation is solved efficiently and provides a good lower bound for the solution to the harder unrelaxed problem. When time and numeric resources were added to the third International Planning Competition (IPC-3) in 2002, it was natural to figure out ways to make a similar relaxation in the metric domain. The techniques used by planners such as Metric-FF, Sapa, and LPG were successful in IPC-3. But when they converted the relaxed plan computation (which is based on earliest time) into a computation for a bound on the metric (lowest cost) there was an opportunity to tighten the bounds, meaning that in theory more searching was being done than was needed.

It is believed that current approaches to plan graph construction for metric optimization domains are specifically tied to the concurrent properties of time. An action A is applied when its preconditions are true, and a calculation is made to update the earliest time any fact in action A's effects can be achieved. This is the maximum time over each of the preconditions plus the duration d of the action, or, $t = \max_{\forall p \in pre(A)}(time(p)) + d$. The time of each fact in action A's add effects is then updated if t improves on the earliest time of the fact.

While this may work for minimizing time, it breaks down when applied to fluents that describe quantities of physical substances or even intangibles like energy use. For example, if one were trying to minimize energy use instead of time, taking the maximum over the energy used to establish each fact in A's preconditions is still a safe, admissible bound, but a tighter bound would be a sum of the energy use of the preconditions, not a maximum. This is because most numeric variables track consumable resources whose use is unaffected by concurrency. But in general, sum-propagation is inadmissible because it overcounts the contribution of any action that contributes to the establishment of two or more preconditions of a future action.

The Metric-FF planner provided the argument that the propositional technique of "ignoring delete lists" could be extended to numeric fluents by representing fluents as a range of real values that can only be expanded (and not shrunk) by the application of actions. But a method for applying this has been elusive. This interpretation is analogous to the propositional relaxed plan.

BRIEF DESCRIPTION OF THE DRAWINGS

The foregoing features of this invention, as well as the invention itself, may be more fully understood from the following description of the drawings in which:

FIG. 1 is a textual representation of a problem description;

FIG. 3 is a textual representation of an action that jointly achieves first and second goals;

FIG. 8 is a tabular representation of an exemplary to illustrative processing in accordance with exemplary embodiments of the invention.

DETAILED DESCRIPTION

Figure 2:
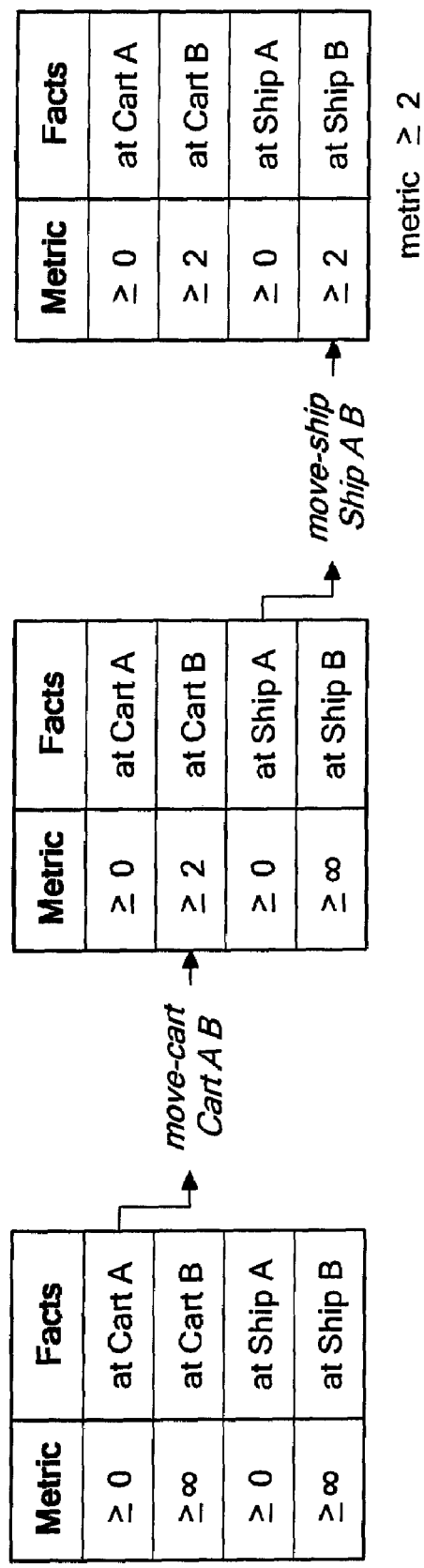
FIG. 2 is a pictorial representation of a relaxed planning graph data progression.

In general, the present invention provides a technique for planners that records constraints over a set of numeric state variables for each fact and characterizes the set of states in which that fact is true. This provides more information to reason about mutual exclusions among sets of states offering a tighter bound on the metric cost of a plan than existing planners currently attain. This more accurate estimate can avoid irrelevant states and decrease search times. The computation required by the inventive technique is polynomial time and is readily implemented within the framework of the conventional algorithms used to grow the planning graph and propagate mutual exclusions in the propositional case.

Another embodiment extends a method of tracking binary mutex relations between facts (i.e. values of facts that are incompatible such as "fact A cannot be true at the same time as fact B is true") to include the tracking of binary relations between facts and numeric fluents, and also among pairs of numeric fluents. Instead of tracking mutual exclusion, an exemplary embodiment tracks ranges of consistency (the dual), and propagates these pairwise consistent ranges. This more accurate estimate can avoid irrelevant states and speed up searches. The computation required by such a technique is easily implemented within the framework of the standard algorithms used to grow the planning graph and propagate mutual exclusions in the propositional case.

In general, domains and problems that benefit from the inventive heuristic embodiments have the following characteristics:

Metrics that are computed as a function over two or more numeric state variables.

A set of actions that each modifies different numeric state variables that are parameters of the metric function.

A significant difference between the aggregate metric cost for planning each goal independently and the optimal metric cost for a plan that achieves the goals jointly (synergy).

Use of fluents to model real-world quantities of resources, and contain actions that transform one resource to another (possibly with different rates of consumption or production) or contain actions that specify multiple ways of transporting resources from one location to another.

Many domains and problems exhibiting these properties have synergetic actions or resources that may be shared by action sequences that achieve different goals. The so-called Settlers domain first proposed in IPC-3 contains the properties that demonstrate the inventive heuristic effectiveness, since the metric is defined over three costs: pollution, labor, and resource-use. As is well known to one of ordinary skill in the art, the Settler's domain refers to a tough resource management domain, requiring that raw materials be collected and processed in order to build more powerful processing facilities and ultimately houses. Materials are moved by ship, train and cart, consuming coal and increasing pollution. Plan quality is judged by a linear combination of labour use, pollution creation and resource consumption. There is scope for constructing hard metrics that involve maximizing housing construction subject to an increasing pollution penalty (say), to ensure that optimal plan quality is bounded.

FIG. 1 describes a planning problem in the Settlers domain in which there are both land and sea routes to the same place and the goal is to move both the cart and the ship to their destinations while minimizing the sum of pollution and labor. In this domain, movement of the cart incurs a labor cost of 2 and movement of the ship incurs a pollution cost of 2.

A simple conventional approach to computing a bound on the metric value for an extracted plan would be to compute a shortest cost path to achieve each of the goals during the construction of the relaxed planning graph. In each level of the planning graph, record the best metric value possible for achieving each fact. After the planning graph construction is completed, the best metric value over the set of goals would be used as a bound on the solution for the original planning problem.

FIG. 2 illustrates the progression of the computation using this prior art method on the example problem. In this approach, each fact is tagged with the value of the metric. Infinite metric values indicate that the fact has not been achieved yet. Known planners such as Metric-FF, Sapa$^{Mps}$, and LPG-TD use a variant of this technique. Notice that taking the maximum over the goals would result in an admissible heuristic value of 2, when the value of the optimal plan has a cost of 4.

Consider the same problem in the same domain but with the added action specified in FIG. 3. This action allows the ship to transport the cart, jointly achieving both goals at a reduced labor cost. This joint action implicitly includes the labor required to load the cart on the ship and unload it at the destination. But the conventional technique judges the joint action transport-cart-on-ship to be irrelevant, because the algorithm assumes that individual movement actions with cost 2 are better than the joint action with cost 3 with respect to the metric. That is, regardless of where the joint action is applied in this computation, the value it contributes is ultimately discarded in favor of the lower metric values achieved by the individual movement actions. At the end of this compilation, the lower bound of the metric values for achieving all of the goals is computed by taking the maximum metric value over all of the goals. This results in a loose lower bound of 2, when intuition suggests a tighter bound with a value of 3 exists through the use of the joint action. As noted above, a simple sum could overestimate the bound, because it would double count the effects of any action used to establish both facts. Therefore, the bound at the end of this example is 2 and not 4, and the last level of the planning graph would still be the same as in FIG. 2.

These two examples illustrate the problems that arise out of simply tracking bounds on the metric cost required to achieve each fact independently, and then attempting to derive from this a bound on the metric over the joint set of goals. Like other known implementations, the inventive system constructs a planning graph from the initial state by repeatedly applying the add effects of actions until reaching a fixpoint in the number of facts. The inventive system differs, however, in the way that it is determined when an action is applicable, and how the planning graph data structure is updated when applying the effects of the action to the state.

In general, inventive embodiments employ a two-stage relaxed plan construction to evaluate potential changes to the planning graph. The first stage is a compilation of a data structure called a constraint set, which calculates bounds on the metric and discovers the best enabling action to establish each fact according to the metric. The second stage, construction of the relaxed plan, can greedily add actions to achieve a low-metric path from the initial state to the goal using the constraint set as a lookup table.

Described below is an exemplary embodiment of construction of the constraint set, which is an improved metric optimization heuristic at the expense of some extra bookkeeping. In cases where the metric is a linear combination of fluents, this approach can prevent the effects of two fluents on the metric bound from interfering with each other. The explanation of metric optimization is made in terms of metric minimization without loss of generality.

In conventional systems, the metric cost of each fact is the lowest cost discovered so far in any relaxed plan that can support the fact. In other words, this value is a constraint that holds over the set of states that are known to be reachable in the relaxed construction and that contain this fact as true. For example, in FIG. 2 after the application of the move-cart action, a bound of 2 on the metric holds over all relaxed states that contain the fact (at Cart B). A bound on the metric for jointly satisfying several goals can be obtained by combining the metric constraints associated with each of these goals, and then simplifying this set. The resulting simplified constraint bounds the metric value for the relaxed states that contain the goals jointly satisfied.

In contrast, the inventive approach generalizes the idea of associating constraints with each fact. Instead of characterizing a set of states by a single inequality on the metric like in FIG. 2, the system associates with each true proposition a set of constraints on each numeric fluent in the domain, e.g., a range or set of ranges of possible values.

Figure 4:
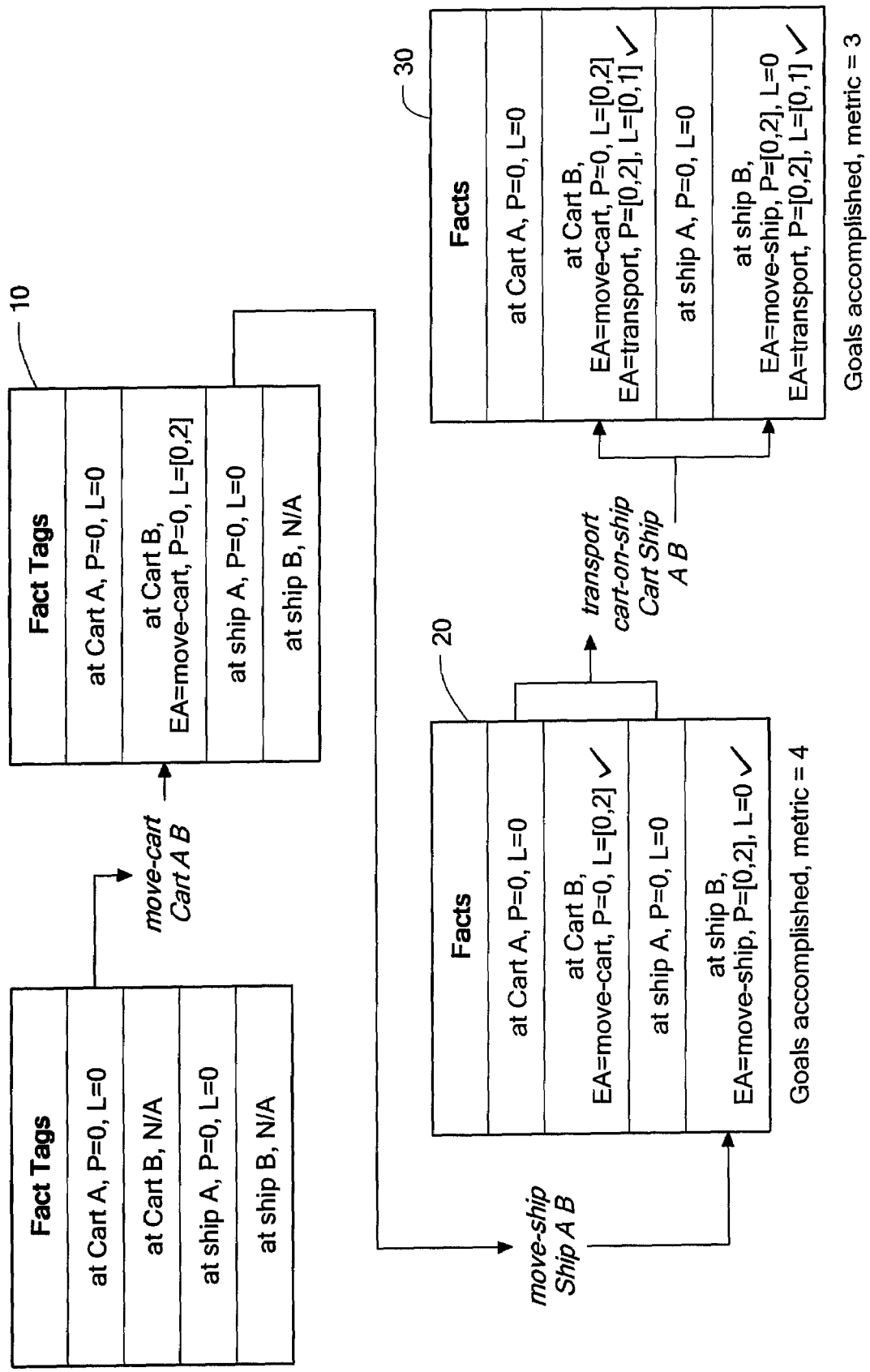
FIG. 4 is a pictorial representation showing effects on a relaxed planning graph for an example problem.

FIG. 4 illustrates the effect of the inventive algorithm on the relaxed planning graph data structure for the example problem. The system associates with each fact the best way of establishing the fact (enablingAction or EA), and constraints over each numeric fluent: pollution (P) and labour (L). The algorithm can discover the cheaper joint action.

The metric value of a state is a function of the ranges of the numeric fluents attached to the literals in that state. The bounding property is preserved when the metric formula is evaluated using the optimistic end of the variable ranges. By associating each fact with bounds on each numeric variable, one can delay the evaluation of the metric until after the actions are applied, so one can accurately see its value across facts. The inventive algorithm does not discard the joint action of FIG. 3, as illustrated in FIG. 4.

As shown in FIG. 4, for state 10 after move-cart action is applied, fact (at Cart B) becomes tagged with EA=move-cart, {P=0, L=[0,2]}. For state 20, after action move-ship is applied, fact (at Ship B) tag becomes EA=move-ship, {P=[0,2], L=0}. At state 30, the joint action transport-cart-on-ship is applied. Note that the facts (at Cart B) and (at Ship B) both are in the effects of the transport action, so a new enabling action field is added to the tag on those facts for EA=transport. At this point there is a choice of actions available to achieve the goals. The metric is computed to decide which to use, which is a union of the constraints on each fluent tagged on the goal facts that contributes to the metric. For the first record in each goal fact (EA=move-cart, EA=move-ship), we get {P=0, L[0,2], P=[0,2], L=0}. Simplifying the constraints yields the set of inequalities: {P=[0,2], L=[0,2]}. This simplification (a union over each fluent) results in the bounds for the case where both facts are jointly achieved. Since the metric=P+L, it follows that the metric is subject to the bounds [0,4]. But when the $2^{nd}$ record for each goal fact is checked (EA=transport for both), the simplified constraints are {P=[0,2], L=[0,1]}, for a metric bound of [0,3]. Thus the enabling action has lower bounds and the joint transport action is chosen.

Relaxed Constraint Propagation

Each fact in an action's preconditions is tagged with a private set of bounds on each numeric variable, representing the history of actions it took to establish that fact. In the following description, the numeric preconditions of an action a will be denoted as nPre(a) and the propositional preconditions of a as nPre(a). The numeric and propositional effects of action a will likewise be denoted nEff(a) and pEff(a). The numeric preconditions of the action itself, if any, are denoted n(a), which may be a set of constraints on different numeric preconditions. To apply the action, one first intersects the ranges of each numeric variable tagged to each of the precondition facts (nPre(a)). If the action has any numeric preconditions n(a), those preconditions are tested against the merged set of constraints of nPre(a). If n(a) ∩ nPre(a) is not empty, the action may be applied. In the pseudocode listing of Table 1 discussed below, this is referred to as preC(V).

Note that this conjunction can raise the lower bound of a numeric variable, offering a tighter bound on the metric. preC(V) is not just a test for applicability of the action, it supplies the ranges of numeric fluents in Von which the action's effects operate.

Figure 5:
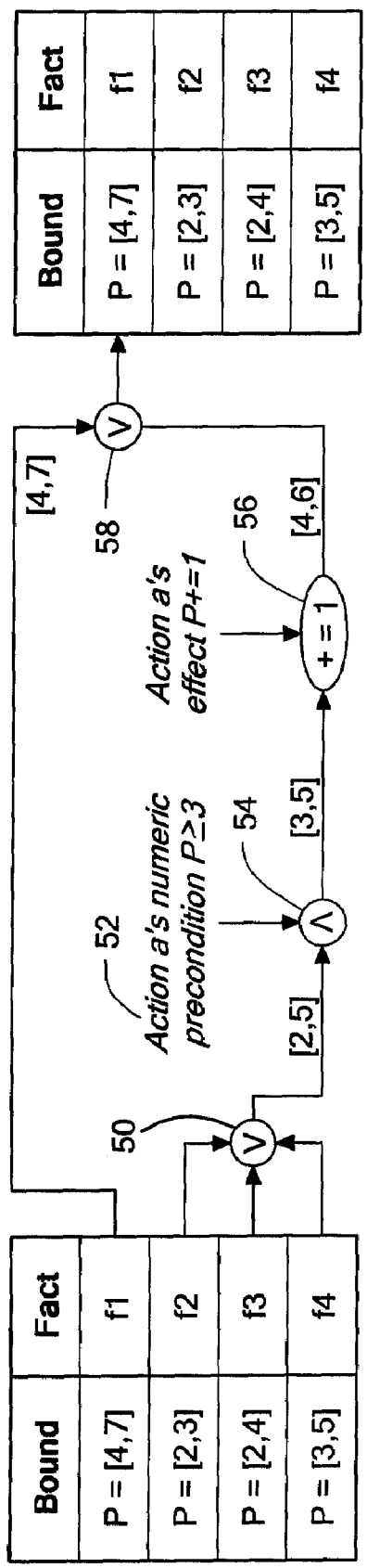
FIG. 5 is a pictorial representation showing updates of numeric tags on facts when applying an action.

FIG. 5 shows an example of updating numeric tags on facts when an action is applied. For the sake of the example, assume A requires f2, f3, and f4 be true, and A also as a numeric precondition that P≧3, and a numeric effect that sets f1 true and increases P by 1. The number constraint operated on by action A is the conjunction 54 of its numeric precondition 52 and the disjunction 50 of the numeric constraints attached to the three preconditions of A, which results in P=[3,5] after 54.

Note that the bounds on P have contracted from P=[2,5] to P=[3,5] by the intersection (or conjunction, or AND) with the actions numeric preconditions. Intuitively, the contraction of the range is valid because the action can only propagate values of P≧3. One would not see a value of P<3 associated with this fact unless it were added by another action with a lower precondition, or by another action with an increasing effect on this variable. Action A's numeric effect is to increment P 56, shifting its range, and since f1 is the only fact mentioned in its effect list, the bound on P is only updated 58 for fact f1: P=[4,7]∨P=[4,6]⇒P=[4,7]. Bounds on facts not in the effects are unaffected by A.

The action's numeric effects operate on preC(V), and the resulting new set of constraints over the numeric fluents is tagged onto each fact in the action's effects. Unlike other approaches that only expand the bounds on numeric fluents, the inventive system applies an action's increment effects by "shifting" the bounds of a numeric variable, or incrementing both upper and lower bounds by an equal amount. Any decrement effects would be similarly shifted downward. For example, as in FIG. 4, when the cart is moved, it shifts the bounds for the labour fluent, and likewise the movement of the ship shifts the bounds for pollution.

If a fact in the effects of an action (pEff(a)) were previously unsupported, then application of the action will initialize the fact in the constraint set and assign it the results of applying the action's numeric effects to preC(V). Otherwise, the newly calculated constraints must be reconciled with those already tagged on the fact. The constraints characterize all states containing that fact as true. The reconciliation of the constraints representing this fact must be a union over those states; i.e., they must characterize both the states previously introduced by previous actions as well as the new ones introduced by the current action.

As the example problem showed, there may be multiple ways to establish a fact. After an action is applied, the metric is tested across the goal facts to see if the action has lowered the cost. If so, the cheaper enabling action is recorded with the fact.

Reinterpreting "Ignoring Delete Effects"

A conventional planning graph is updated for each of the add effects of the action, ignoring its delete effects. However, in the inventive system the notion of "ignoring delete effects'" is interpreted more broadly than in conventional system. As the system updates each of the action A's add effects, if A makes a false fact true, this must be the first time that the algorithm has applied any action that affects this fact. Therefore, the set of constraints that characterize this state is exactly the set resulting from the application of A. If a fact in the effects of A was already true before A was applied, one must relax the constraints already associated with that fact to reflect this new path through state space that achieves this fact. This is the union of the constraints previously associated with the fact and the new set of constraints that were just derived.

Interpreted this way, the concept of "ignoring delete effects" might not be taken so literally. The relaxation in the inventive algorithm occurs in the computation of the union of the constraints associated with a fact with those in the effects of the action. In general, keeping track of the sets of constraints that exactly characterize all of the states that contain a particular fact as true would require an exponential amount of memory. So what is 'ignored' in this case is the details of an exact disjunction.

Referring again to FIG. 5, this figure illustrates the way constraints on numeric variables are updated when an action is applied. A more subtle relaxation that also occurs through this final union 58 is the fact that prior to this final union for each set of constraints, each variable in that set is bounded within the context of the bounds on the other variables in that same set (i.e., by the first intersection). After the action is applied, here may be interference effects from the context of one set of constraints with the other et of constraints.

A basic strategy in a metric minimization search is to efficiently find a set of states in which a particular fact is true, rated by the lowest metric cost of achieving the state. The goal is the ultimate fact to be found, but each intermediate step involves searching for ways of making facts true. An exemplary data structure called cSet is used to provide a lower bound by relaxing the problem.

ComputeConstraintSet is an exemplary algorithm for computing cSet as set forth in Table 1 below.

TABLE 1

ComputeConstraintSet algorithm pseudocode
ComputeConstraintSet(I, V, A)

| | |
|---|---|
| Inputs: | Facts that are true at the start I, the set of numeric state variables V with initial values, the set of actions A; |
| Output: | cSet data structure that can be used as a lookup table when building the relaxed plan, and offers bounds on the metric for that plan. |
| 1. | FQ = I; // fact cache |
| 2. | forall f ∈ I do |
| 3. | cSet(f) = {$a_{init}$, initialValues(V)}; |
| 4. | endforall |
| 5. | AQ = {a ∈ A | pPre(a) ⊆ FQ and nPre(a) satisfied} |
| 6. | while AQ ≠ ∅ |
| 7. | a ← an action in AQ; |
| 8. | if cSet(pPre(a)) has >1 enabling action then |
| 9. | chooseBestEnablingAction(pPre(a)); |
| 10. | forall v ∈ V do |
| 11. | preC(v) ← (∨nPre(a)$|_v$) (∧n(a)$|_v$); |
| 12. | if preC(v) = ∅ then continue; |
| 13. | endforall |
| 14. | forall f ∈ pEff(a) do |
| 15. | cSet(f) ← (cSet(f) ∪ |
| 16. | {a,cSet(f) ∨apply(nEff(a),preC)}; |
| 17. | FQ ← FQ ∪ f; |
| 18. | endforall |
| 19. | AQ ← actions newly satisfied; |
| 20. | endwhile |

Steps 1-4 initialize the fact and action queue FQ and AQ, and cSet(f) is the data structure that keeps track of the ranges of each numeric fluent variable v and the enabling action for each fact f. Each fact in cSet(f) is initialized with the initial values of each variable, associated with a special action $a_{init}$ that has no preconditions and its add effects include every fact in I. In step 5, actions with preconditions satisfied in FQ are added to an action queue AQ. Then one removes actions from the queue and tries to apply them. Steps 10-13 represent the processing of preconditions illustrated in FIG. 5 for each numeric variable v associated with the precondition facts. Any numeric preconditions of action a involving variable v (notated as n(a)$|_v$) are intersected with those precondition bounds. If there are no numeric preconditions n(a)$|_v$, it imposes no constraint on variable v and the intersection is not needed. If preC(v) is empty for any variable, it means that the numeric preconditions cannot be satisfied and the action cannot be applied. Note that if it is not empty, the range of the intersection over nPre(a) might contract due to the intersection with n(a).

If the precondition test is satisfied, the action is applied to preC(v) and merged with tags on facts in its effects (steps 14-18). If fact f were not already true in the world, then the cSet(f) imposes no constraint in step 16, so the fact is initialized with the results of the action. Each new fact in the action effects is added to the fact queue FQ (step 17), which may result in more actions being enabled (step 19). If any fact's tag in cSet(f) was updated, then this step will re-enqueue all actions that have already been handled with this fact as a precondition so they can be reapplied. This is done because a lower metric value might propagate forward and modify the tags of other facts. If the fact f is already true, then the existing set of numeric bounds is merged with those current ranges.

Steps 8-9 record the best action to enable a fact. This can be used as a look-up table to find the action responsible for the lowest-metric way to establish a fact during construction of the relaxed plan. In the end, the system provides a lower bound on the metric value for making a particular fact true, as well as the action responsible for the best improvement in the cost of establishing that fact.

Termination Criteria

The termination criterion of ComputeConstraintSet includes the standard leveling criteria of non-numeric algorithms, and additionally ensures that the goals can be achieved for the least cost. The criterion also ensures termination in the case of a problem with a cycle where actions are constantly lowering a fluent, since this causes the ranges to expand lower.

The criterion is this: One measures how many updates it takes to level off in the facts (so that no more facts can be made true), and also that all action preconditions that require numeric fluents to be a certain value have that value be met. Say that this requires n action applications before this occurs. Then, from the point that these subgoals are all true, one would only continue to update facts for n more actions. This works because one knows that in order to establish all facts that can be made true, n actions must be applied. Therefore, if there are any cycles involved they would have been traversed at least once during these n applications. Even if there are additional updates to propagate after that, they would only re-traverse cycles.

Admissibility and Informedness

The constraintSet algorithm tags each fact with a compressed representation of all of the relaxed states that can make that fact true. The metric value is a function of the numeric state, so one keeps track of the numeric state with this "compressed" form in mind. One way to do that is to characterize the set of numeric states as a range for each variable. This is admissible because any states that are inadvertently allowed in (through the use of just an interval to describe the variable range) would simply make the lower bound lower, so admissibility of the bound is not lost.

It is known that summing the metric costs over all of the goals yields an inadmissible heuristic but gains better average performance, whereas taking the maximum over the goals trades off the heuristic quality for admissibility. The reason why taking the maximum grants admissibility is because the optimal plan could use the same grounded action to help achieve multiple goals. In this case, using a summation of the costs would over-count these shared actions, overestimating the true cost. Within the framework of computation of the relaxed planning graph, keeping the sequence of actions that result in the chosen metric value for every fact and testing set overlap would take excessive space, so this information may not be available.

There are a number of parts to the cost propagation of the constraintSet algorithm, which is illustrated in FIG. 5. First, the algorithm uses disjunction on the bounds of variables tagged to fact preconditions of an action. This is admissible because like in max-propagation, it does not overcount the contribution of shared actions. Second, as discussed above, when an action has a precondition n(a), it is possible for the numeric bounds supplied by the preconditions to shrink. This is valid because there is no case in which action a may be applied when n(a) is violated. Therefore, this is admissible as well.

The third and fourth parts determine how the action affects the pre-existing numeric state, and how the result of those effects are merged into the next numeric state, and they are discussed together. Increment and decrement effects of actions are applied by shifting the bounds; i.e., by incrementing or decrementing the lower bounds on fluents that are increasing. Assume that the constraint set compilation is in an intermediary state. If an action adds a new fact f, the result of the action's effects on the numeric state simply becomes the numeric state tagged to that fact. This does not cut off any state since the fact is new. If fenEff(a) were already true prior to the application of the action, the resulting bounds from the algorithm's effects are merged (i.e., a union) with the pre-existing bounds. This is akin to widening the range of the numeric fluents, and any action that would have previously been applicable is still applicable now.

Since bounds on numeric fluents are maintained separately for each fact rather than one global set for all facts, the effect an action has of expanding ranges of fluents is more limited in the inventive algorithm than in current practice. Therefore, if any irrelevant actions are expanding ranges of fluents for unrelated facts, the algorithm does not loosen the bounds on the relevant facts. This is an admissible way to maintain tighter bounds on the metric.

Because the constraint set compilation does not drop any preconditions or goal constraints that are in the unrelaxed problem, the heuristic retains basic informedness.

The above described planning graph techniques can be implemented in a wide variety of systems with various hardware and software partitioning in a manner well known to one of ordinary skill in the art.

Figure 6:
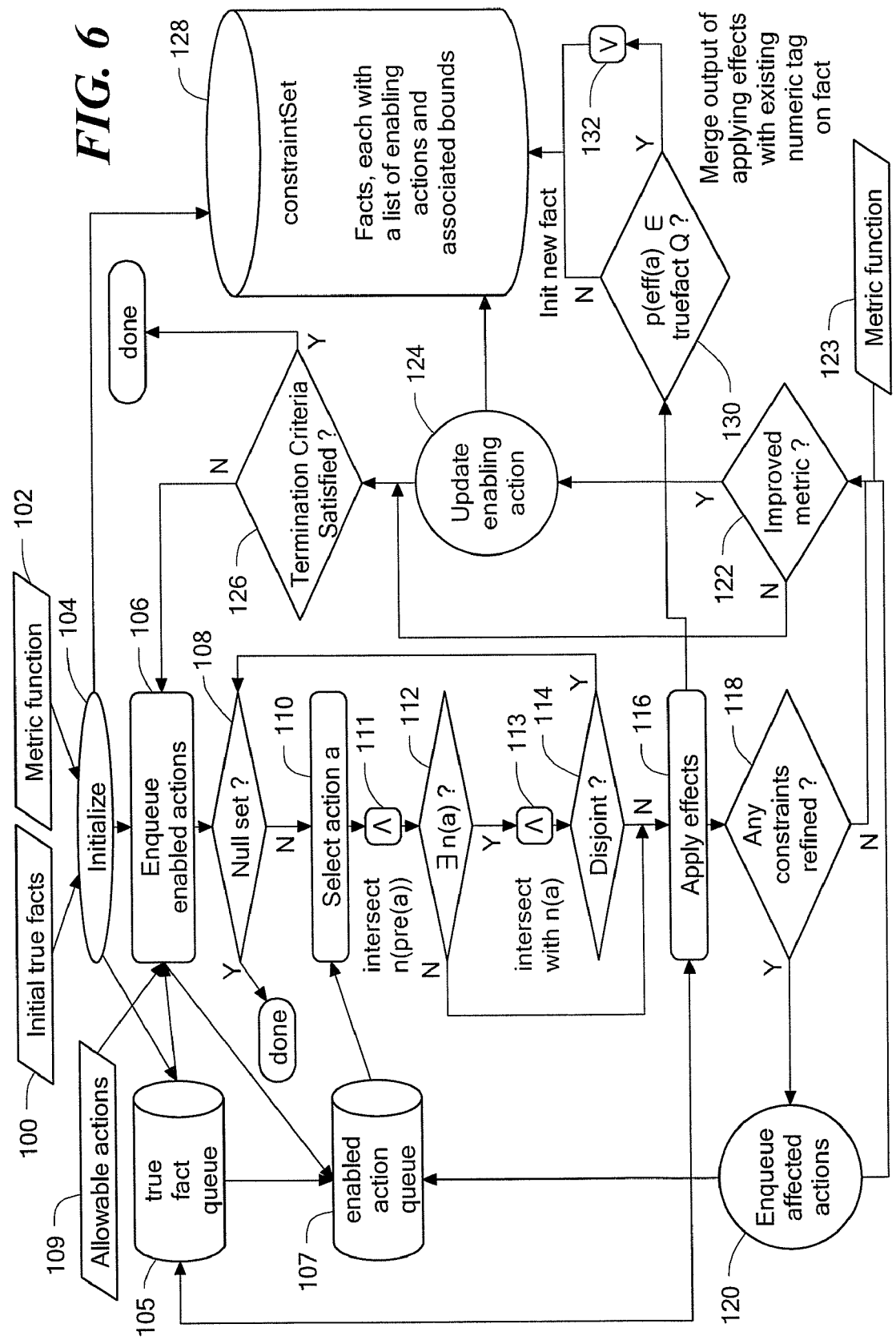
FIG. 6 is a flow diagram of an exemplary sequence of steps to implement metric planning in accordance with the present invention.

FIG. 6 shows an exemplary sequence of steps to implement exemplary planning graph techniques, including the ConstraintSet functionality of Table 1, in accordance with the present invention. Initial true facts 100 and metric module information 102 is provided to an initialization step 104 that includes placing facts in the true fact queue 105. In step 106, enabled actions are enqueued in the enabled action queue 107. Allowable actions 109 are available for queuing in step 106. In step 108, it is determined whether the queue of enabled actions is a null set, i.e., empty. If so, processing terminates. If not, in step 110, an action is selected for a merge 111 of n(pre(a)) and n(a) over variable v. In step 112 it is determined whether there are any n(a)). If not, the conjunction in step 113 is unnecessary and the action effects are applied in step 116. If so, the conjunction 113 is performed and in step 114 it is determined whether the intersection is disjoint. If so, processing continues in step 108. If not, the effects are applied in step 116.

In step 118, it is determined whether any constraints have been refined. If so, the affected actions are enqueued in step 120. If not, in step 122 it is determined, such as by a metric module 123, whether the metric is improved. If so, in step 124, the enabling action is updated and in step 126 it is determined whether termination criteria have been satisfied. The updated enabling action is stored in a constraintSet database 128 where each fact has a list of enabling actions and associated bounds.

After applying action effects in step 116, it is determined in step 130 whether the fact is already true in the world. If so, then the existing set of numeric bounds is merged 132 with the current ranges. If not, the new fact is placed in the constraintSet database 128.

It is understood that exemplary embodiments of the invention can be implemented in a wide range of hardware and software configurations with departing from the present invention. Various hardware and software partitions can be made to meet the needs of a particular application.

Figure 7:
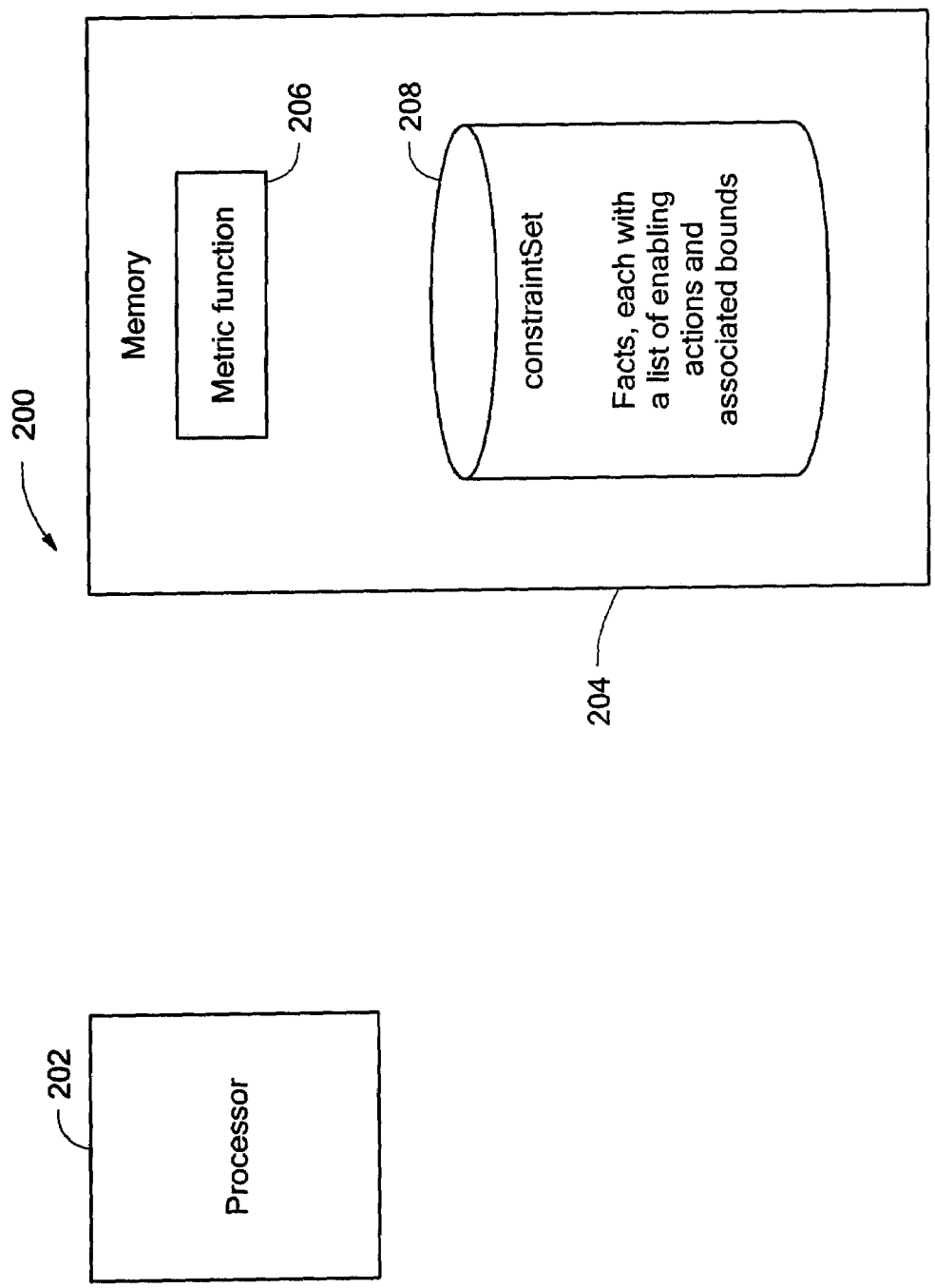
FIG. 7 is a block diagram of a system having metric planning in accordance with the present invention.

FIG. 7 shows an exemplary system 200 on which exemplary sequence of steps in FIG. 6 can be implemented. The system 200 includes a processor 202 coupled to memory 204. A metric module 206 interacts with a constraint set database 208 containing facts with a list of enabling actions and associated bounds. The metric module 206 and the constraint set database 208 combine to provide the inventive metric planning functionality.

Another exemplary embodiment is set forth below. The problem is defined as follows:

```
(define (problem settlers)
    (:domain civ)
    (:objects
        A B - place
        Cart - vehicle)
    (:init
        (= (available wood A) 2)
        (= (available wood B) 0)
        (= (available wood Cart) 0)
        (= (space-in Cart) 1)
        (connected-by-land A B)
        (is-cart Cart)
        (at Cart A)
    (:goal (and
        (>= (available wood B) 2)))
    (:metric minimize
        (total-time)))
```

The above listing is another relatively simple problem description in the IPC3 Settlers domain in which there is only one way to transport the wood from location A to location B. Furthermore, the transport vehicle, the cart, has only a capacity of 1, even though a total number of 2 units of wood must be transported.

The method employed by known planners such as Metric-FF, Sapa, and LPG handles numeric fluents as ranges, and reasons over a planning graph where these numeric ranges monotonically expand with the number of actions being applied in a relaxed fashion. These planners use mutual exclusion ("mutex") reasoning between propositions to limit the number of states that must be searched. However, these planners do not extend the idea of mutex reasoning on propositions into the numeric fluents. Without such numeric mutex reasoning, the plan to achieve the goals according to the relaxed planning graph would be to execute the load action twice, move the cart to location B, and then unload two units of wood at the intended location. This non-intuitive effect results from the relaxed plan due to the lack of mutex reasoning over numeric fluents. In effect, as soon as the preconditions were satisfied for the first load action, they remain satisfied and hence the action can be executed again. The fluent representing the wood carried in the cart seemingly then violates the cart capacity, allowing the cart to carry more wood than it is supposed to.

The RAPSODI (Rapid Adversarial Planning with Strategic Opponent-Driven Intelligence) planner constructs a planning graph from the initial state by repeatedly applying the add effects of actions until one reaches a fix-point in the number of facts.

The inventive techniques differ, however, in that we propagate mutex information not only between propositions, but also between propositions and numeric fluents, and between numeric fluents. This approach relies on the ability to represent values in a continuous domain with a method more expressive than a simple upper and lower bound, as traditional planners have done. This representation should further have the property that our mutex constraints can continue to be tracked without requiring the tracking of individual point values. This ensures that the space and time complexity are still polynomial and not exponential.

Consider the initial values for the numeric fluents. Just as in propositional mutex theory, whatever values are currently present are not mutex with any propositions that are true. What are mutex at the start are the entire real-value range except for the point value. Since there is a duality between tracking mutexes and non-mutexes, we will, without loss of generality, simply track non-mutexes and call this binary relation the constraint set. In this case, we create an associative pair between each true proposition and each fluent's initial values. We also create a numeric-numeric constraint set annotating the pair-wise consistency between each of the numeric fluents' initial values. The propositional mutexes as in the non-numeric case are also generated.

Note that every fact and every numeric fluent has a constraint set that says which fluent values are consistent with that fact or numeric fluent. So in the example in FIG. 8, the information in the constraint set for each fact and numeric fluent contains information about how that particular fact or numeric fluent is consistent with each of the four fluents. Then, when an action is applied to the relaxed state, fact-fact mutexes are propagated as they would be in the non-numeric case, but we can extend the propagation rules to cover relations between propositions and numeric mutexes as well as numeric-numeric mutexes. Consider the following rule:

If a fact f is mutex with any preconditions of the action, then any new facts introduced into the relaxed state by applying the post-condition of the action are also mutex with f.

Extending this rule to cover numeric fluents, this rule means that anything inconsistent with this fact is also inconsistent with the application of the action. If this action adds new facts, then the new facts still have not appeared in any case consistent with facts and numeric fluents mutex with f. With regards to the inventive algorithm, this means that we should take the intersection of all of the constraints collected between the preconditions of the action, to give us what are consistent values for the numeric fluents. The action would be applied to just these consistent values, with its numeric preconditions possibly cutting out some of the consistent values, which would result in some new constraint set c' over the numeric fluents. The action's effects are then applied to the relaxed state. In the case of new propositions in the post-conditions, they would be made true in the relaxed state and initialized with the constraint set c'. With numeric effects, if the action increases or decreases a fluent's value, then the new values introduced into the relaxed state of a numeric fluent would be associated with the constraint set c'.

Note that the representation of this association is of interest. If one were to associate ranges with other ranges, them information is lost. To illustrate the point, assume that this association is represented with ranges. A numeric fluent $f_1$ has some range [1, 2], and this is associated with another numeric fluent $f_2$'s range [3, 4]. At some other time, $f_1$'s range of [2,3] is associated with f2's range of [4,5]. With a single range-like representation, we can only say that $f_1$'s range of [1,3] is consistent with $f_2$'s range of [3,5], which actually admits some non-consistent ranges. Also, it does not capture the possibly important constraints that we have not seen $f_1$ [1,2] associated with $f_2$ [4,5], or $f_1$ [2,3] associated with $f_2$ [3,4]. While admitting non-consistent ranges is an optimistic relaxation that preserves admissibility, much of the power of numeric mutexes requires the preservation of this information and keeping out these non-consistent ranges.

Referring back to our example with the computed constraint set c', for any proposition p already true in the relaxed state that the applied action adds, if p is not mutex with any of the action's preconditions, we must update p's constraint set with the union of its current constraint set and the set of consistent values in c'. This ensures that any new consistent ranges that are achieved by the application of this action are noted as being consistent with p.

With this description of how the constraint sets are propagated, now consider the following rule:

Actions can only be applied if their preconditions are satisfied in the relaxed state and if there are no mutexes between any two preconditions.

Extending this to our framework, we will require not only the rule to be true over propositional mutexes, but that the constraint sets across all of the propositions and the numeric fluent ranges intersect to be consistent. That is, each constraint set represents the allowable values for the numeric fluents when a particular fact were true, so therefore if we require all of the action's preconditions to be simultaneously true, there must be some state where the constraint sets for all precondition facts are consistent with one another. Furthermore, the result of the intersection must also satisfy the action's numeric preconditions. If all of these conditions are satisfied, then the action is applicable at this point in time.

The tabular representation of FIG. 8 shows the progression of the fact-fact mutexes, fact-numeric consistency, and numeric-numeric consistency structure for the example problem. In this example, we illustrate the application of the mutex update rule, and show what happens as load/unload and movement actions are applied to the relaxed state. For clarity, we enumerate all point-values representing pairwise consistencies with the caveat that some other efficient representation is available to contain this information. Each row illustrates the result of applying the action indicated on the left to the state of mutexes in the previous row (with the exception of the initial state whose row indicates how the mutexes are initialized). Each line in a mutex or consistency box of the table represents a single binary relation between the values indicated. Lines in bold are those that are new or modified from the previous mutex state.

First, the propositional mutexes are initialized by recording a mutex for every pair of propositions that are not true in the initial state. Fact-numeric consistency relations are initialized by creating a pair for every true fact and numeric value. Numeric-numeric consistency relations are initialized by creating a pair for every two numeric values.

Next, the load-cart-at-A action is applied. According to our consistency rules, we take all binary relations consistent with our preconditions and operate on this set. These include all of the relations listed in the first row. The preconditions of the load-cart-at-A action mention at least one element in every single relation. For the relation (wood-A=2, wood-B=0), we generate a new relation (wood-A=1, wood-B=0), because this is a consistent relation resulting in the application of our action. In the same way we generate the other bolded relations in the second column. Notice that we do not generate any (at-cart-B, x) consistency relations with any numeric fluents because of our propagation rule that if something is mutex with our precondition (in this case at-cart-B with our precondition at-cart-A), then it should be mutex with any new facts that we add—in this case the facts that we add are wood-A=1 and wood-cart=0. Since we are expressing consistency relations between the numeric fluents, we should therefore not include any relation involving at-cart-B.

Note at this point that even if we were to apply the load-cart-at-A action again, our mutex propagation rules do not allow the cart to have more than one resource. According to our propagation rules, we must apply the load-cart-at-A action to only those relations that are consistent with its preconditions. In the second row, all relations mentioning wood-cart=1 would be inconsistent with the action's numeric precondition (<wood-cart 1). All other relations have already been processed in the previous application of the load-cart-at-A action except for the new relation (wood-A=1, wood-B=0). This indicates limits of our binary relation representation. A ternary relationship would record exclusion between wood-A, wood-B, and wood-cart, but since we are only recording binary relations, this information is lost. However, the information on the exclusiveness of wood-A with wood-cart, and wood-B with wood-cart is at least preserved.

Then we apply the move-cart-A-B action. The only precondition required is at-cart-A, and therefore, the consistency relations we add are the add effects of at-cart-B with anything that was consistent with our precondition. This has no effect on the numeric-numeric relation column (because none of these relations mention our precondition at-cart-A), but on the fact-numeric column, we double the number of relations. Basically, for every relation (pre(a), X), where X is not in the delete list of action a, we will add a new relation (add(a), X). The added fact is at-cart-B and that's why we have the new set of relations.

Next we apply the unload-cart-at-B action. According to our propagation rules, we can only apply this action to the non-empty set of relations that are consistent with its preconditions: (at-cart-B) and (>wood-cart 0). The relations (wood-A=2, wood-B=0), (wood-A=1, wood-B=0), (wood-A=1, wood-cart=1), and (wood-B=0, wood-cart=1) are the consistent ones in the numeric-numeric relations, and these result in new relations in this column. Only four relations in the fact-numeric relation column are consistent with our preconditions: (at-cart-B, wood-A=2), (at-cart-B, wood-A=1), (at-cart-B, wood-B=0), and (at-cart-B, wood-cart=1). The numeric add list for this action on the relaxed state includes just (wood-cart=0) and (wood-B=1). In this case, the only new fact-numeric relation added is (at-cart-B, wood-B=1).

At this point, our propagation rules can be shown to be superior to simply using a numeric relaxed state. Note that as soon as unload-cart-at-B is supported, traditional planners would allow that action to be applied multiple times, resulting in an infinite number of wood resources to be unloaded at location B. However, if we apply the unload-cart-at-B action once more on the last row in our table we do not generate any new consistency relations, and hence the wood-B fluent will not increase. The reason we don't generate new consistency relations is because we require that we only apply the action on relations consistent with the numeric preconditions (which in this case happened to be the already-processed relations from the previous row and none of the new relations added in the most recent iteration). In order to get the second wood resource to location B, we would have to apply the other actions again, possibly increasing the time, number of actions, and metric fluents as well.

In an exemplary instantiation, we adopt the following simplifying assumptions:

Numeric preconditions of action A each only mention one fluent.
Numeric preconditions of action A are an inequality comparing a fluent with a constant.
Numeric postconditions of action A only increment or decrement by a constant.

The following terminology is used:
pre(A)=propositional goals of A (preconditions).
$pre_i(A) = \cap_{j=numPre\_mentioning\_fluent\_i}\{c | assigning\ fluent\ i\ a\ value\ of\ c\ satisfies\ j\}$ If a fluent i is not mentioned then $pre_i(A) = \{all\ real\ numbers\}$
$eff_i(A)$=the numeric effect of A that modifies fluent i.
$apply(eff_i(A), c)$=applies the numeric effect i to the value c.
$apply(eff_i(A), S_i)$=applies the numeric effect i to the set of values in $S_i$.
applyRelaxed(S, A)=apply the relaxed effects of A to the relaxed state S.
time(f)=a timestamp for when the fact f is made true.
$time_i(c)$=a timestamp for when the value c can be consistently assigned to fluent i.
$time(S) = \max_{c \in S} time(c)$.
(Note that the time relations are global just as the relaxed state is global).

Next, the "lowerbound" function is the main function, which accepts an initial state $S_I$, a set of goals G, and the set of all possible actions A. FF, FN, and NN are the fact-fact mutex relations, fact-numeric consistency relations, and numeric-numeric consistency relations, respectively. Basically it keeps on looping until a fixed point is reached (i.e. no new actions are being enabled) or the time when our goals are first satisfied. Exemplary pseudo-code for the lowerbound function is set forth below:

```
lowerbound(S_I, G, A)
    FF = {<f_1, f_2> | f_1 ∈ S_I ∨ f_2 ∈ S_I}
    FN_i = {<f, n> | f ∈ S_I ∧ n ∈ S_Ii}
    NN_ij = {<n_1, n_2> | n_1 ∈ S_Ii ∧ n_2 ∈ S_Ij}
    S' = Ø
    S = S_I
    for each f ∈ S_I // initialize times to 0
        time(f) = 0
    end // for
    for each f ∉ S_I // initialize times to infinity
        time(f) = ∞
    end // for
    while S ≠ S' ∧ ¬supported(G, S, FF, FN, NN)
        S = S'
        FF = FF'
        FN = FN'
        NN = NN'
        for each a ∈ A such that supported (pre(a), S, FF, FN, NN)
            <S'', FF'', FN'', NN''> = propagate(a, S, FF, FN, NN)
            S' = S' ∪ S''
            FF' = FF' ∪ FF''
            FN' = FN' ∪ FN''
            NN' = NN' ∪ NN''
        end // for
    end // while
    if ¬supported(G, S, FF, FN, NN)
        return fail // fixed point reached and goals not satisfied.
    else
        return max(time(G), max_i time(G_i))
end // lowerbound
```

Figure 9:
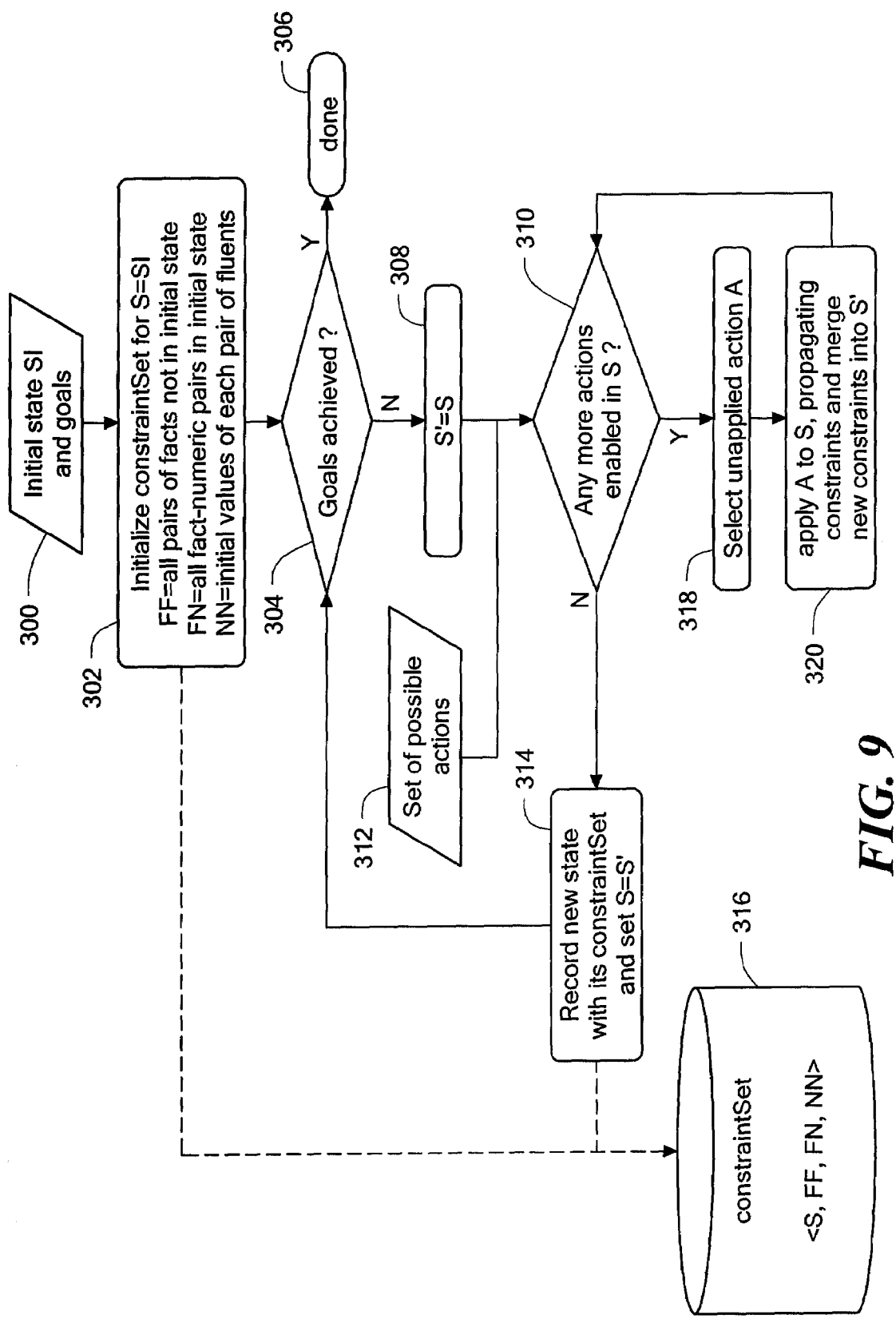
FIG. 9 is a flow diagram showing an exemplary sequence of steps for planning in accordance with exemplary embodiments of the invention.

FIG. 9 shows an exemplary sequence of steps for the lowerbound function corresponding to the pseudo code above. In step 300, there is provided an initial state for $S_I$ and goals. In step 302, a constraintSet for $S=S_I$ is initialized, where FF=all pairs of facts not in the initial state, FN=all fact-numeric pairs in the initial state, and NN=initial values of each pair of fluents.

In step 304 it is determined whether the goals are achieved. If so, processing is complete in step 306. If not, in step 308, S' is set equal to S and in step 310 it is determined whether any more actions are enabled in S based upon a set of possible actions 312. If not, in step 314, the system records a new state with its constrantSet and S is set equal to S'. The new state can be stored in a constraintSet database 316. Processing then continues in step 304. If more actions were enabled, in step 318 the system selects unapplied action A and in step 320 action A is applied to S propagating constraints and merging new constraints in into S'.

Assuming that all of the propositional facts are supported in S, the "satisfies" function, set forth below, returns the facts and the numeric values that are consistent and non-mutex with respect to the goals G:

---

$<P, P_1, ..., P_F> = $ satisfies(G, S, FF, FN, NN)
$P = \{f_1 \in G \mid [\neg \exists f_2 \in G \mid <f_1, f_2> \in FF] \wedge$
$\forall i [\exists c \mid <f_1, c> \in (FN_i \cap S_i \cap G_1)]\}$
for each $i \in 1..F$ // loop over each numeric fluent
$P_i = \{c \in G_i \cap S_i \mid [\forall f \in G, <f, c> \in FN_i] \wedge$
$[\forall j \exists n \mid <c, n> \in NN_{i,j}]\}$
end // for
end // satisfies

---

The "supported" function checks to make sure all of the propositional facts in G exist in the relaxed state S and that none of these facts are mutex (the line mentioning FF). Then, in the line mentioning FN, it verifies that for each fluent, there is some assignment to that fluent that is consistent with all the other propositional facts being simultaneously true. Note that we only require one value to be found out of the set $G_i$ to satisfy this requirement as opposed to requiring all elements of the set to match (as is the case with the propositional facts in G). In the last line mentioning the set NN, we are checking each fluent to make sure there exists at least one assignment such that all other fluent assignments can be co-assigned (what value we assign to the others is unimportant so long as such a value exists):

--- supported(G, S, FF, FN, NN)
$G \subseteq S \wedge$
$\forall f_1, f_2 \in G, <f_1, f_2> \in FF \wedge$
$\forall i \in 1..F, \exists c \in G_i \mid [\forall f \in G, <f, c> \in FN_i] \wedge$
$\forall i \in 1..F, \exists c \in G_i \mid [\forall j \in 1..F, \exists n \mid <c, n> \in NN_{i,j}]$
end // supported

---

The "propagate" function updates the mutex data structures FF, FN, and NN given an action a to apply and the relaxed state S. Simultaneously it finds the maximum time over the preconditions of action a, adds the duration of a to this time, and updates the times to any new values that would be added to the relaxed state. It also applies the action to the relaxed state and outputs the updated state:

---

$<S', FF', FN', NN'> = $ propagate(a, S, FF, FN, NN)
// First, update the mutex and consistency relations, also
// simultaneously find the maximum time.
$t = \max(0, \max_{c \in pre(a)} time(c))$ // max time over propositional facts
FF' = the way Graphplan propagates fact-fact mutexes.
for each $i \in 1..F$ // loop over fluents
$P = \{<f, c> \mid f \in eff_i(a) \wedge$ // P is a non-mutex set of values
that support a
$c \in (S_i \cap pre_i(a)) \wedge$
$<f, c> \in FN_i\}$
$t = \max(t, \max_{c \in P} time(c))$
$FN'_i = FN_i \cup \{<f, apply(eff_i(a), c)> \mid <f, c> \in P\}$
for each $j \in 1..F$ // loop over fluents for each pair of
fluents in numeric-numeric mutexes
$Q = \{<c_1, c_2> \mid c_1 \in (S_i \cap pre_i(a)) \wedge$ // Q is a non-mutex set of
values that support a
$c_2 \in (S_j \cap pre_j(a)) \wedge$ $<c_1, c_2> \in NN_{i,j}\}$
$t = \max(t, \max_{c \in Q} time(c))$
$NN'_{i,j} = NN_{i,j} \cup \{<c_1, apply(eff_j(a), c_2)> \mid <c_1, c_2> \in Q\}$
end // for
end // for
// Next, apply the action to the relaxed state and simultaneously
// update the relaxed state.
S' = S
$t_{end} = t + $ duration(a)
$<R, R_1, ..., R_F> = $ satisfies(pre(a), S, FF, FN, NN)
for each $c \in $ add(a) // propositional add effects of a.
$S' = S' \cup c$
time(c) = min(time(c), $t_{end}$)
end // for
for each $i \in 1..F$ // loop over fluents
for each $c \in $ apply(eff$_i$(a), $R_i$) // each value a modifies in fluent i
$S'_i = S'_i \cup c$
time(c) = min(time(c), $t_{end}$)
end // for
end // for
end // propagate

---

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method of generating a plan for a planner including tightening bounds on a metric cost of the plan, comprising:
   tagging a fact with a compressed representation of relaxed states that can make the fact true;
   generating, using a computer, the compressed representation as a range of possible values that a numeric variable for the relaxed states can possibly take on when the fact is true, where the range of the numeric variable includes a set of disjoint ranges;
   computing a new range of values for the numeric variables as a combination of ranges of values tagged on each precondition of an action modified by effects of the action; and
   outputting the plan in a format to enable display for a user to make decisions for reaching a plan goal.

2. The method according to claim 1, further including computing the new range of values for the numeric variables as a logical AND of ranges of values tagged on each precondition of an action modified by effects of the action.

3. The method according to claim 1, further including applying the effects of the action by shifting the range of numeric values in the state by an amount of the action's effect on the numeric variable.

4. The method according to claim 3, further including a search termination criterion that is true when all actions have been applied without altering the ranges of numeric variables tagged to any fact.

5. A computer-implemented method of generating a plan, comprising:
   associating with each fact in each state a compressed representation of all of the relaxed states that can make the each fact true, wherein the compressed representation is a range of possible values that each numeric variable can possibly take on when the fact is true; and
   outputting the plan in a format to enable display for a user to make decisions for reaching a plan goal.

6. The method according to claim 5, wherein the range of each of the numeric variables can be a set of disjoint ranges.

7. The method according to claim 6, wherein each of the facts is tagged with a list of enabling actions, each of the actions associated with the set of bounds on numeric variables that represents the supporting subgraph through that action.

8. The method according to claim 7, further including using an update rule that describes when an action is applicable in a particular state of the numeric variables.

9. The method according to claim 8, wherein the numeric bounds of the variables associated with each precondition fact of the action are merged using a disjunction.

10. The method according to claim 8, further including, if there are any numeric preconditions to the action, conjoining the numeric preconditions with the merged numeric state, which can result in contraction of the range of the numeric bounds on one or more of the numeric variables.

11. A method of generating a plan for a planner that can produce tighter bounds on a metric cost of the plan, comprising:
   for a first state, tagging a first fact with a first enabling action;
   for a second state, tagging a second fact with a second enabling action;
   for a third state, tagging the first and second facts with a joint action to generate a choice of actions to achieve planning goals;
   computing, using a computer, a constrained metric from a range of numeric fluents associated with the first and second facts that represents the lowest cost way to achieve each precondition of an action, and can be used to select a first one of the choice of actions; and outputting the plan in a format to enable display for a user to make decisions for reaching a plan goal.

12. The method according to claim 11, further including tagging the first fact with an action's preconditions including a set of bounds on the numeric fluents of the first fact representing a compressed history of actions it required to establish the first fact.

13. The method according to claim 11, wherein computing the metric further includes shifting bounds for the numeric fluents, by the amount of the effects of each action.

14. The method according to claim 13, wherein the shifting bounds includes shifting downward.

15. The method according to claim 13, wherein the shifting bounds includes shifting downward or upward.

16. A system for generating a plan, comprising:
   a first means for tagging facts with enabling actions; and
   a second means for computing a metric to tighten bounds on a metric cost of the plan.

17. The system according to claim 16, wherein the second means can contract the bounds.

* * * * *

UNITED STATES PATENT AND TRADEMARK OFFICE
CERTIFICATE OF CORRECTION

PATENT NO. : 7,533,073 B2  Page 1 of 1
APPLICATION NO. : 11/566984
DATED : May 12, 2009
INVENTOR(S) : Howard et al.

It is certified that error appears in the above-identified patent and that said Letters Patent is hereby corrected as shown below:

Col. 5, line 47, delete "Von" and replace with -- V on --.

Col. 5, line 51, delete "as" and replace with -- has --.

Col. 6, line 35, delete "in conventional" and replace with -- in a conventional --.

Col. 6, line 63, delete ", here" and replace with -- , there --.

Col. 6, line 64, delete "et" and replace with -- set --.

Col. 11, line 51, delete "them" and replace with -- then --.

Col. 14, line 1, delete "=≡" and replace with -- ≡ --.

Col. 14, line 3, delete "=≡" and replace with -- ≡ --.

Col. 14, line 7, delete "=≡" and replace with -- ≡ --.

Col. 14, line 12, delete "=≡" and replace with -- ≡ --.

Col. 14, line 30, delete "$NN_{ij}$" and replace with -- $NN_{i,j}$ --.

Col. 15, line 4, delete "in into" and replace with -- into --.

Col. 15, line 13, delete "...$G_1$..." and replace with -- "...$G_i$... --.

Col. 16, line 16, delete "$S^1$..." and replace with -- $S^1_i$ --.

Signed and Sealed this

Fourth Day of August, 2009

JOHN DOLL
*Acting Director of the United States Patent and Trademark Office*